United States Patent
Chaudhary et al.

(10) Patent No.: US 12,022,493 B2
(45) Date of Patent: Jun. 25, 2024

(54) SMART DATA MODE FOR 5G WIRELESS DEVICES

(71) Applicant: Apple Inc., Cupertino, CA (US)

(72) Inventors: Madhusudan Chaudhary, Campbell, CA (US); Arun G. Mathias, Los Altos, CA (US); Rajesh Ambati, Los Altos Hills, CA (US); Ajay Singh, San Jose, CA (US); Franco Travostino, San Jose, CA (US); Muthukumaran Dhanapal, Sunnyvale, CA (US); Lakshmi N. Kavuri, San Jose, CA (US); Ajoy K. Singh, Cupertino, CA (US); Thanigaivelu Elangovan, Santa Clara, CA (US); Ioannis Pefkianakis, San Jose, CA (US); Raghuveer Mallikarjunan, Sunnyvale, CA (US); Faraz Faheem, Santa Clara, CA (US); Geoffrey R. Hall, San Jose, CA (US); Harshit Chuttani, Campbell, CA (US); Rohan C. Malthankar, San Jose, CA (US); Prashant H. Vashi, Sunnyvale, CA (US); Hisham A. Mahmoud, San Jose, CA (US); Henri S. Berger, Los Altos, CA (US); Divyaprakash P. Bhojkumar, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 787 days.

(21) Appl. No.: 17/189,015

(22) Filed: Mar. 1, 2021

(65) Prior Publication Data
US 2021/0282127 A1  Sep. 9, 2021

Related U.S. Application Data

(60) Provisional application No. 62/984,674, filed on Mar. 3, 2020.

(51) Int. Cl.
*H04W 72/51* (2023.01)
*H04L 65/61* (2022.01)
(Continued)

(52) U.S. Cl.
CPC ............. *H04W 72/51* (2023.01); *H04L 65/61* (2022.05); *H04W 52/027* (2013.01);
(Continued)

(58) Field of Classification Search
None
See application file for complete search history.

(56) References Cited

U.S. PATENT DOCUMENTS 8,619,745 B2  12/2013  Kuo
10,194,327 B1  1/2019  Khan
(Continued)

FOREIGN PATENT DOCUMENTS

CN  109257804 A  1/2019
CN  110557793 A  12/2019
(Continued)

OTHER PUBLICATIONS

Qualcomm Inc et al: "UE Assistance Information for power saving", 3GPP Draft; R2-1911303 UE Assistance Information for Power Saving, 3rd Generation Partnership Project (3GPP), vol. RAN WG2, No. Prague, Czech; Aug. 16, 2019, XP051769060, Retrieved from the Internet: URL:http://www.3gpp.org/ftp/tsg_ran/WG2_RL2/TSGR2_107/Docs/R2-1911303.zip [retrieved on Aug. 16, 2019].
(Continued)

*Primary Examiner* — Robert M Morlan
(74) *Attorney, Agent, or Firm* — DICKINSON WRIGHT RLLP

(57) ABSTRACT

Embodiments described herein relate to managing access to 5G cellular baseband resources for 5G-capable wireless devices. A wireless device can monitor application work-
(Continued)

| Factors | | | Output | | |
|---|---|---|---|---|---|
| AV Flow in Foreground? | Screen State | Download Size/Rate | Bandwidth | Confidence Level | Example Application Services |
| Yes | On or Off | Capped (e.g., < 4Mbps) | Low | High | Streaming Media, AV Teleconference |
| | | Not Capped | High | High | Streaming Media |
| No | On | Large | High | High | App Store, Speed Test, Internet Browser |
| | | Not Large | High | Low | eMail, Messaging, Internet Browser |
| No | Off | Large | High | High | Video Download, App Content Download |
| | | Not Large | Low | High | eMail, Audio Download, Audio Streaming | loads by analyzing communication network performance requirements for a given application in-use or launching for future use along with system-level indications of overall device usage, battery level, and mobility status to determine whether access to 5G cellular baseband resources is recommended for an application. A 5G cellular baseband resource recommendation is provided for an application indicating a level of bandwidth in current use or expected for future use as well as a confidence metric in the bandwidth level indication. The 5G cellular baseband resource recommendation is used with additional device criteria to determine whether access to one or more 5G radio frequency bands is allowed.

20 Claims, 13 Drawing Sheets

(51) Int. Cl.
*H04W 52/02* (2009.01)
*H04W 72/0453* (2023.01)

(52) U.S. Cl.
CPC ..... *H04W 52/0277* (2013.01); *H04W 52/028* (2013.01); *H04W 72/0453* (2013.01)

(56) References Cited

U.S. PATENT DOCUMENTS

| | | |
|---|---|---|
| 2004/0071146 A1 | 4/2004 | Belling |
| 2006/0143692 A1 | 6/2006 | Kodama et al. |
| 2014/0018033 A1 | 1/2014 | Luna |
| 2015/0350598 A1* | 12/2015 | Yang ............... H04L 65/80 348/14.02 |
| 2019/0132876 A1* | 5/2019 | Shikari ............ H04W 72/0453 |
| 2019/0320496 A1 | 10/2019 | Li et al. |
| 2019/0373525 A1 | 12/2019 | Singh et al. |
| 2020/0014523 A1 | 1/2020 | Huang et al. |
| 2020/0356149 A1* | 11/2020 | Chae ............... G06F 1/3215 |

FOREIGN PATENT DOCUMENTS

| | | |
|---|---|---|
| JP | 2014204393 A | 10/2014 |
| JP | 2019197990 A | 11/2019 |
| KR | 20080043258 A | 5/2008 |
| WO | 2019094790 A1 | 5/2019 |
| WO | 2019226116 A1 | 11/2019 |

OTHER PUBLICATIONS

Apple Inc: "UE Power Saving Techniques", 3GPP Draft; R1-1902771 Power Saving Techniques Based on UE Adaptation, 3rd Generation Partnership Project (3GPP); vol. RAN WG1 Meeting #96, Athens, Greece; Feb. 25, 2019-Mar. 1, 2019, XP051600466, Retrieved from the Internet: URL:http://www.3gpp.org/ftp/tsg%5Fran/WG1%5FRL1/TSGR1%5F96/Docs/R1%2D1902771 %2Ezip [retrieved on Feb. 16, 2019].

Mediatek Inc: "UE Power Saving Enhancements Secure 5G/NR success", 3GPP Draft; RP-191096 REL-17 UE Power Saving, 3rd Generation Partnership Project (3GPP), vol. TSG RAN #84, Newport Beach, CA, USA; from Jun. 3, 2019-Jun. 6, 2019, XP051747310, Retrieved from the Internet: URL:http://www.3gpp.org/ftp/Meetings%5F3GPP%5FSYNC/RAN/Docs/RP%2D191096%2Ezip [retrieved on Jun. 2, 2019].

European Patent Application 21765470.6—Extended European Search Report dated Jan. 18, 2024.

Chilean Patent Application No. 2390-2022—First Office Action dated Oct. 19, 2023.

International Patent Application No. PCT/US2021/020443—International Search Report and Written Opinion dated Jun. 22, 2021.

"Brown, 'Exploring the Potential of mmWave for 5G Mobile Access', Qualcomm, White Paper, Heavy Reading, Jun. 2016 <URL: https://www.qualcomm.com/media/documents/files/heavy-reading-whitepaper-exploring-the-potential-of-mmwave-for-5g-mobile-access.pdf> pp. 1-12."

Indian Patent Application No. 202217048802—First Examination Report dated Feb. 12, 2024.

Chinese Patent Application No. 202180018460.5—First Office Action dated Dec. 1, 2023.

Japanese Patent Application No. 2022-552484—First Office Action dated Sep. 28, 2023.

* cited by examiner

5G Standalone (SA) Network Architecture

5G Non-Standalone (NSA) Network Architecture

| Factors | | | Output | | Example Application Services |
|---|---|---|---|---|---|
| AV Flow in Foreground? | Screen State | Download Size/Rate | Bandwidth | Confidence Level | |
| Yes | On or Off | Capped (e.g., < 4Mbps) | Low | High | Streaming Media, AV Teleconference |
| | | Not Capped | High | High | Streaming Media |
| No | On | Large | High | High | App Store, Speed Test, Internet Browser |
| | | Not Large | High | Low | eMail, Messaging, Internet Browser |
| No | Off | Large | High | High | Video Download, App Content Download |
| | | Not Large | Low | High | eMail, Audio Download, Audio Streaming |

Smart Data Mode

| Trigger | Functionality |
| --- | --- |
| 5G Cellular Recommendation | Enable/Disable FR1/FR2 Based on Bandwidth |
| Display Screen Status | Display Screen On (Default Enable 5G, Disable 5G on Demand)<br>Display Screen Off (Default 4G LTE, Enable 5G on Demand) |
| Media Stall Imminence | Enable FR1/FR2 when Media Stall Imminent |
| Wi-Fi Status | Disable FR1/FR2 when Wi-Fi Recommended |
| Cellular Data Status | Disable FR1/FR2 when Cellular Data Off |
| App Processor Status | Disable FR1/FR2 when App Processor in Reduced Power State |
| VoIP/Video Connection | Select FR1 or FR2 Based on Power, Thermal, and Mobility Characteristics |
| Mobility State | Disable FR2 when in Motion and Failure Threshold Exceeded |
| Reduced Power Mode | Disable FR2 when in Reduced Power Mode |

5G NR Control

| 5G Cellular Baseband Resource Recommendation || 5G Cellular Baseband Control Action |
| High Bandwidth | Confidence Level | |
|---|---|---|
| Yes | Yes | Enable FR1 and/or FR2 |
| Yes | No | Enable FR1 and/or FR2 |
| No | Yes | Disable FR1 and FR2 |
| No | No | Enable FR1 and/or FR2 |

*FIG. 10*

SMART DATA MODE FOR 5G WIRELESS DEVICES

CROSS-REFERENCE TO RELATED APPLICATIONS

The present application claims the benefit of U.S. Provisional Application No. 62/984,674, entitled "SMART DATA MODE FOR 5G WIRELESS DEVICES," filed Mar. 3, 2020, the content of which is incorporated herein by reference in its entirety for all purposes.

FIELD

The described embodiments relate to wireless communications, including methods and apparatus for managing access to 5G cellular baseband resources for 5G-capable wireless devices.

BACKGROUND

Newer generation, e.g., fourth generation (4G) and fifth generation (5G), cellular wireless networks that implement one or more $3^{rd}$ Generation Partnership Project (3GPP) Long Term Evolution (LTE), LTE Advanced (LTE-A), and 5G standards are rapidly being developed and deployed by network operators worldwide. The newer cellular wireless networks provide a range of packet-based services, with 5G technology providing increased data throughput and lower latency connections that promise enhanced mobile broadband services for 5G-capable wireless devices. The higher data throughput and lower latency of 5G is expected to usher in a range of new applications and services as well as improve existing ones. Network operator data plans have tended to increase data allocation sizes and decrease cost per byte over time; however, data plans are generally capped and even unlimited data plans can limit throughput for certain users. In addition, 5G cellular connectivity at high data throughputs may require additional power consumption and thermal dissipation management from mobile wireless devices with limited battery capacity. There exists a need for mechanisms to determine when best to enable access to 5G cellular connections based a variety of factors.

SUMMARY

This application relates to wireless communications, including methods and apparatus for managing access to 5G cellular baseband resources for 5G-capable wireless devices. 5G cellular technology offers higher data throughput rates and lower latency connections for 5G-capable wireless devices. Wider bandwidth, higher frequency, and shorter distance 5G wireless connections can require higher power consumption and improved thermal management in the 5G-capable wireless devices. As 4G LTE technology will coexist with 5G deployments for years, enabling access to 5G baseband resources to establish 5G radio bearers when best suited for a wireless device's configuration and a user's service subscription plan can allow for balancing application performance with power and thermal management priorities. Access to 5G cellular baseband resources is provided to improve application performance, e.g., higher data rates for voice over Internet Protocol (VOIP) call and video call connections, as well as to offer new services previously hindered by lower data rate 4G performance, e.g., cloud network storage backup services over cellular wireless connections. Key communication service information such as service subscription plan parameters and radio access technology in use can be provided to applications of a wireless communication device to allow for improved user experience. Relative cost factors for cellular and non-cellular wireless connections, application data throughput requirements, latency requirements, quality of service (QOS) parameters, thermal dissipation, and power availability can be considered when allowing access to 5G cellular baseband resources to one or more applications operating on a wireless communication device. Access to 5G cellular wireless connections can be prioritized over wireless local area network (WLAN), e.g., Wi-Fi®, in certain circumstances.

Application workload monitoring on a wireless communication device can include analysis of network performance requirements for a given application in-use or launching for future use along with system-level indications of overall device usage, battery level, and mobility status to determine whether access to 5G cellular baseband resources is recommended for an application. In some embodiments, a 5G cellular recommendation is provided for an application indicating a level of bandwidth in current use or expected for future use as well as a confidence metric in the bandwidth level indication. In some embodiments, the bandwidth-level indication is either high, indicating a positive recommendation for access to 5G cellular baseband resources for the application, or low, indicating a negative recommendation. In some embodiments, a value of high or low is provided for a confidence level regarding the accompanying bandwidth-level indication for the application. In some embodiments, data-driven machine learning can adapt decision logic regarding a particular user of the wireless communication device and/or the wireless communication device's suitability to access 5G cellular baseband resources for one or more applications, such as based on a past history of application data usage and performance requirements. In some embodiments, an application subsystem of a wireless communication device provides application-level information regarding audio/video media usage, expected data content size, and/or data flow parameters to an analysis subsystem that also obtains wireless network connection information from a communication subsystem. The analysis subsystem uses the application-level information and the wireless network information to determine a 5G cellular recommendation. Relevant application information can include foreground/background status, traffic class, transfer size, active/idle status, bit rate requirements, and streaming media requirements. Additional information can include system states such as battery status, screen status, user configuration regarding cellular data and non-cellular data (e.g., Wi-Fi) usage, mobility state, reduced power modes (at an application, processor, and/or device level) and the like. A cellular baseband controller can determine whether 5G baseband resources in one or more radio frequency bands are available for use by a particular application.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 4 illustrates an exemplary workload modeling table to determine a 5G cellular recommendation for an application based on a number of application-level and device-level factors, according to some embodiments.

FIG. 7 illustrates an exemplary smart data mode table summarizing 5G cellular baseband functionality based on different triggering criteria, according to some embodiments.

FIG. 10 illustrates a summary table mapping a 5G cellular baseband resource recommendation to possible 5G cellular baseband control actions, according to some embodiments.

DETAILED DESCRIPTION

Figure 1:
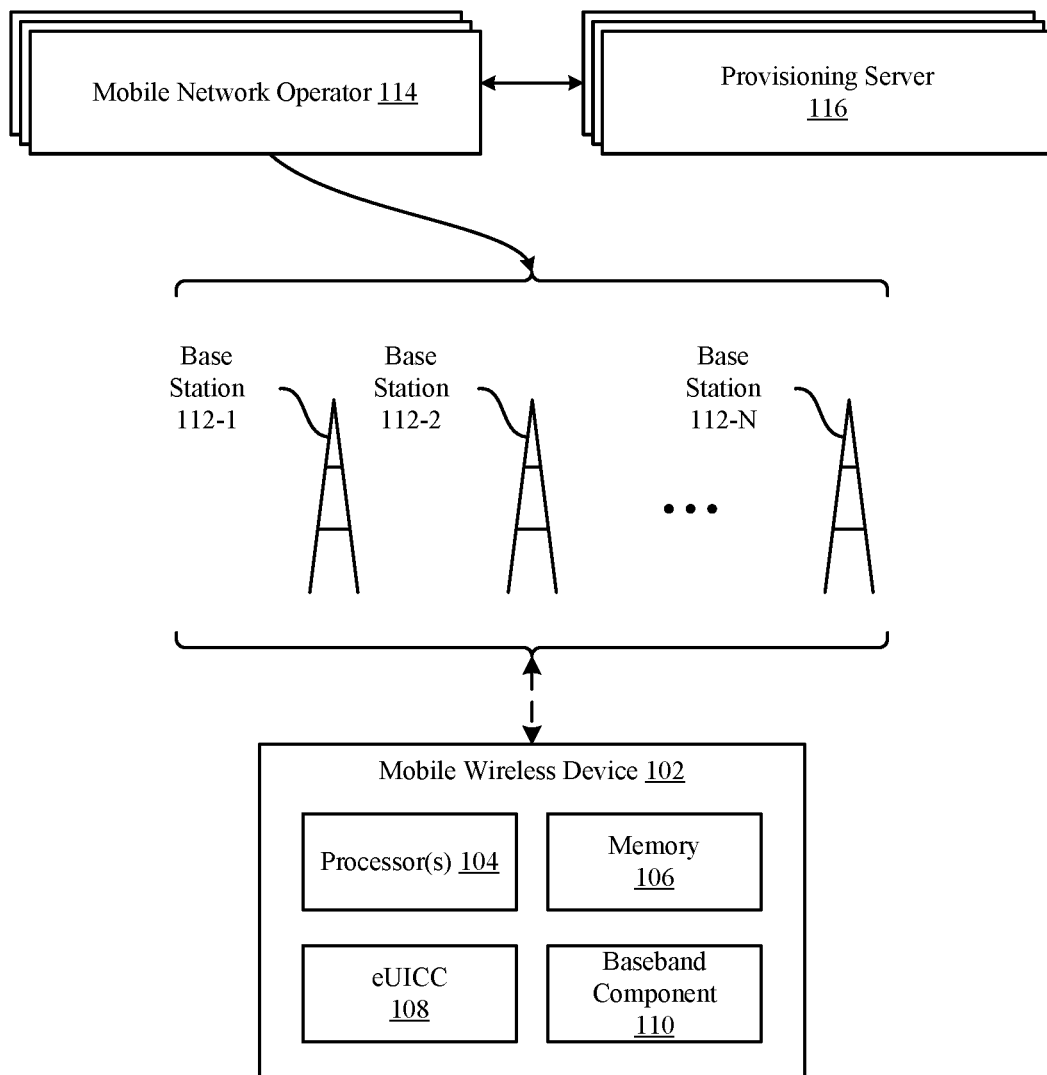
FIG. 1 illustrates a block diagram of different components of an exemplary system configured to implement cellular service provisioning to a wireless device, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

This Application relates to wireless communications, including methods and apparatus for managing access to 5G cellular baseband resources for 5G-capable wireless devices. 5G cellular technology offers higher data throughput rates and lower latency connections for 5G-capable wireless devices. Wider bandwidth, higher frequency, and shorter distance 5G wireless connections can require higher power consumption and improved thermal management in the 5G-capable wireless devices. As 4G LTE technology will coexist with 5G deployments for years, enabling access to 5G baseband resources to establish 5G radio bearers when best suited for a wireless device's configuration and a user's service subscription plan can allow for balancing performance with power and thermal management priorities. Access to 5G is provided for improving application performance, e.g., higher data rates for voice over Internet Protocol (VOIP) call and video call connections, as well as offer new services previously hindered by lower data rate 4G performance, e.g., cloud network storage backup services over cellular connections. Key communication service information such as service subscription plan parameters and radio access technology in use can be provided to applications to allow for improved user experience. Relative cost factors for cellular and non-cellular wireless connections, application data throughput requirements, latency requirements, quality of service (QOS) parameters, thermal dissipation, and power availability can be considered when allowing access to 5G cellular baseband resources to one or more applications. Access to 5G cellular can be prioritized over Wi-Fi in certain circumstances.

Application workload monitoring can include analysis of network performance requirements for a given application in-use or launching for future use along with system-level indications of overall device usage, battery level, and mobility status to determine whether access to 5G cellular baseband resources is recommended for an application. In some embodiments, a 5G cellular recommendation is provided for an application indicating a level of bandwidth in current use or expected for future use as well as a confidence metric in the bandwidth level indication. In some embodiments, the bandwidth-level indication is either high, indicating a positive recommendation for access to 5G cellular baseband resources for the application, or low, indicating a negative recommendation. In some embodiments, a value of high or low is provided for the confidence level regarding the accompanying bandwidth-level indication for the application. In some embodiments, data-driven machine learning can adapt decision logic regarding a particular user and/or device's suitability to access 5G cellular baseband resources for one or more applications, such as based on a past history of application data usage and performance requirements. In some embodiments, an application subsystem of a wireless device provides application-level information regarding audio/video media usage, expected data content size, and/or data flow parameters to an analysis subsystem that also obtains wireless network connection information from a communication subsystem. The analysis subsystem can use application-level information (obtained from the application subsystem or from another device entity), wireless network information (obtained from the communication subsystem or from another device entity), and/or system level information obtained from one or more device entities to determine a 5G cellular recommendation. Relevant application information can include foreground/background status, traffic class, transfer size, active/idle status, bit rate requirements, and streaming media requirements. System level information can include system states such as battery status, screen status, user configuration regarding cellular data and non-cellular data (e.g., Wi-Fi) usage, mobility state, reduced power modes (at an application, processor, and/or device level) and the like. A cellular baseband controller can determine whether 5G baseband resources in one or more radio frequency bands are available for use by a particular application.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

These and other embodiments are discussed below with reference to FIGS. 1 through 11; however, those skilled in the art will readily appreciate that the detailed description given herein with respect to these figures is for explanatory purposes only and should not be construed as limiting.

FIG. 1 illustrates a block diagram of different components of a system 100 that includes i) a mobile wireless device 102, which can also be referred to as a wireless device, a wireless communication device, a mobile device, a user equipment (UE), a device, and the like, ii) a group of base stations 112-1 to 112-N, which are managed by different Mobile Network Operators (MNOs) 114, and iii) a set of provisioning servers 116 that are in communication with the MNOs 114. The mobile wireless device 102 can represent a mobile computing device (e.g., an iPhone® or an iPad® by Apple®), the base stations 112-1 to 112-N can represent cellular wireless network entities including fourth generation (4G) Long Term Evolution (LTE) evolved NodeBs (eNodeBs or eNBs) and/or fifth generation (5G) NodeBs (gNodeBs or gNBs) that are configured to communicate with the mobile wireless device 102, and the MNOs 114 can represent different wireless service providers that provide specific services (e.g., voice and data) to which a user of the mobile wireless device 102 can subscribe to access the services via the mobile wireless device 102. Applications resident on the mobile wireless device 102 can advantageously access services using 4G LTE connections and/or 5G connections via the base stations 112. The mobile wireless device 102 can include processing circuitry, which can include one or more processors 104 and a memory 106, an embedded Universal Integrated Circuit Card (eUICC) 108, and a baseband component 110. In some embodiments, the mobile wireless device 102 includes one or more physical UICCs, also referred to as Subscriber Identity Module (SIM) cards (not shown), in addition to the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing services offered by one or more different MNOs 114 via communication through base stations 112-1 to 112-N. To be able to access services provided by the MNOs, one or more eSIMs can be provisioned to the eUICC 108 of the mobile wireless device 102. In some embodiments, policies associated with SIMs/eSIMs can determine whether a mobile wireless device 102 can access 5G services via 5G base stations 112. In some embodiments, SIM/eSIM policies can determine cost factors, data throughput rate limits, data capacity limits, application service compatibility, device compatibility, and other criteria for determining whether one or more applications of a mobile wireless device 102 can access 5G services. In some embodiments, SIM/eSIM policies and/or device configurations can determine whether one or more applications can prefer access to services via one or more particular radio access technologies (RATs), e.g., via a 4G LTE connection, via a 5G connection, via a non-cellular wireless connection or the like.

Figure 2:
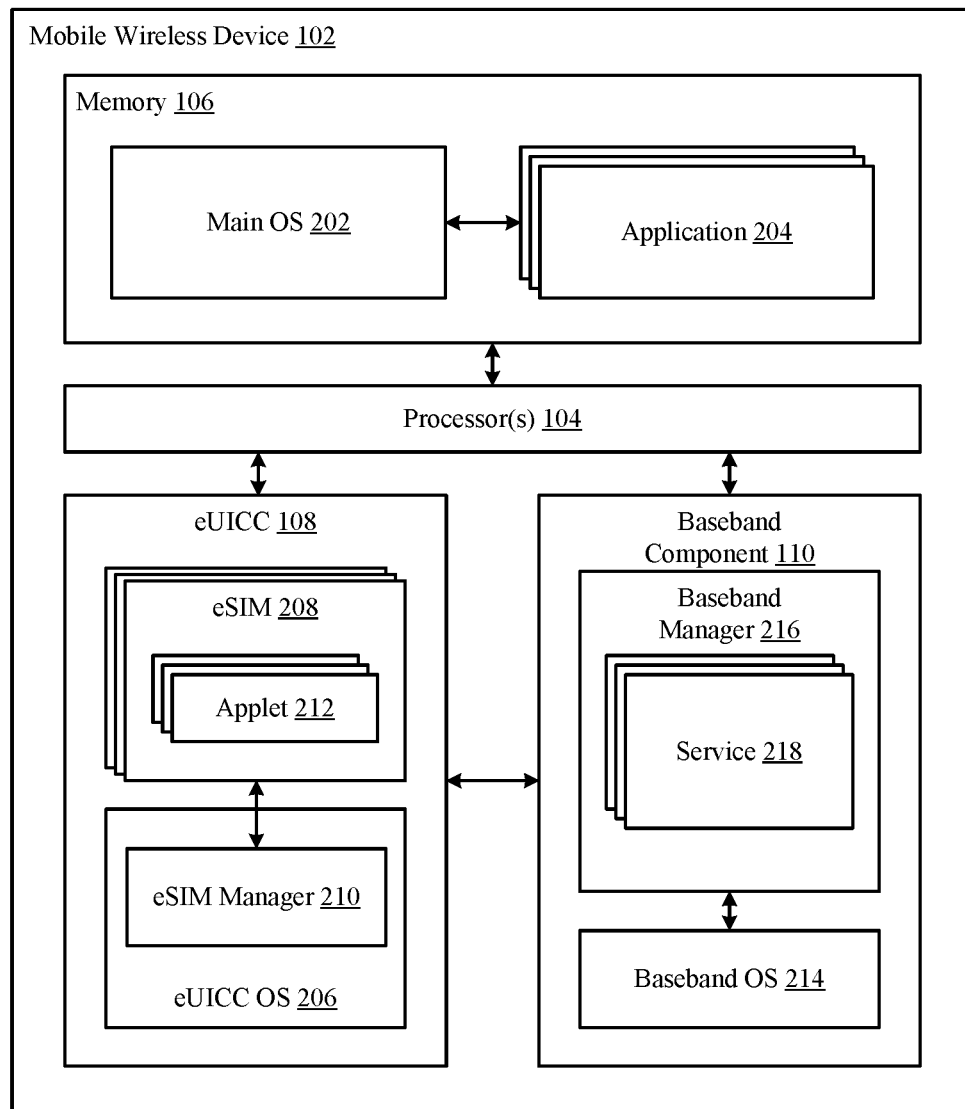
FIG. 2 illustrates a block diagram of a more detailed view of exemplary components of the system of FIG. 1, according to some embodiments.

FIG. 2 illustrates a block diagram 200 of a more detailed view of exemplary components of the system 100 of FIG. 1. The one or more processors 104, in conjunction with the memory 106, can implement a main operating system (OS) 202 that is configured to execute applications 204 (e.g., native OS applications and user applications). The one or more processors 104 can include applications processing circuitry and, in some embodiments, wireless communications control circuitry. The applications processing circuitry can monitor application requirements and usage to determine recommendations about communication connection properties, such as bandwidth and/or latency, and provide information to the communications control circuitry to determine suitable wireless connections for use by particular applications. The communications control circuitry can process information from the applications processing circuitry as well as from additional circuitry, such as the baseband component 110, and other sensors (not shown) to determine states of components of the mobile wireless device 102, e.g., reduced power modes, as well as of the mobile wireless device 102 as a whole, e.g., mobility states. The communications control circuitry, in some embodiments, can also account for SIM/eSIM policies that influence whether an application or service of the mobile wireless device 102 can access particular RATs, such as access to 5G cellular connections. The communications control circuitry can provide control signals to the baseband component 110 to determine which RATs particular applications can access. The mobile wireless device 102 further includes an eUICC 108 that can be configured to implement an eUICC OS 206 to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, updating, or otherwise performing management of the eSIMs 208 within the eUICC 108 and providing the baseband component 110 with access to the eSIMs 208 to provide access to wireless services for the mobile wireless device 102. The eUICC OS 206 can include an eSIM manager 210, which can perform management functions for various eSIMs 208. Each eSIM 208 can include a number of applets 212 that define the manner in which the eSIM 208 operates. For example, one or more of the applets 212, when implemented by the baseband component 110 and the eUICC 108, can be configured to enable the mobile wireless device 102 to communicate with an MNO 114 and provide useful features (e.g., phone calls and internet) to a user of the mobile wireless device 102.

A baseband component 110 of the mobile wireless device 102 can include a baseband OS 214 that is configured to manage hardware resources of the baseband component 110 (e.g., a processor, a memory, different radio components, etc.). According to some embodiments, the baseband component 110 can implement a baseband manager 216 that is configured to interface with the eUICC 108 to establish a secure channel with a provisioning server 116 and obtaining information (such as eSIM data) from the provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3A:
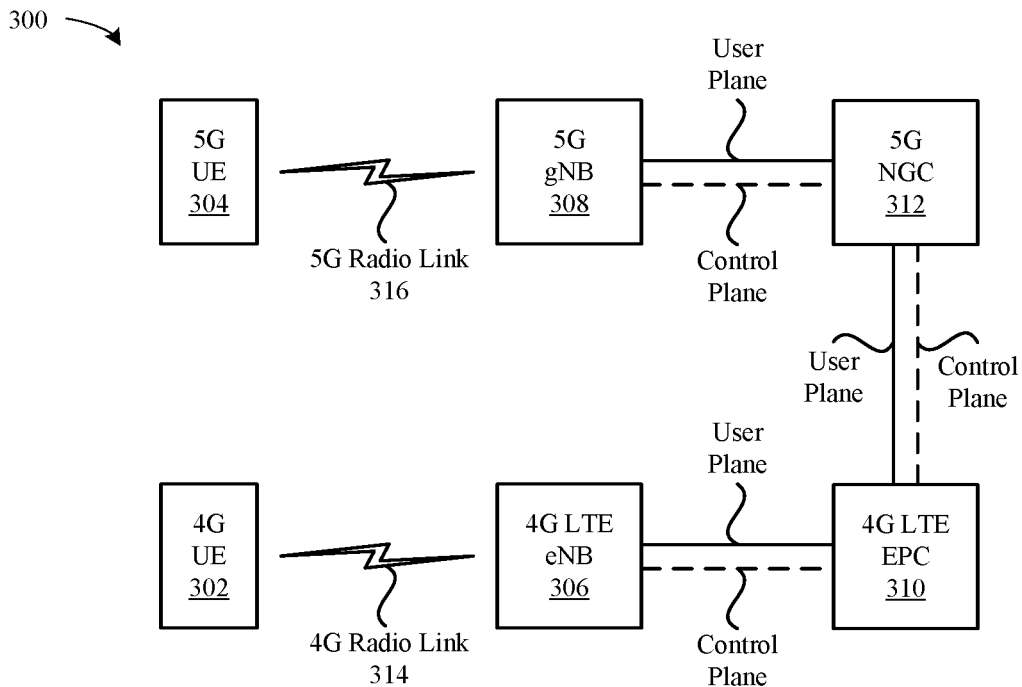
FIGS. 3A and 3B illustrate block diagrams of 5G non-standalone and standalone network architectures, according to some embodiments.
Figure 3B:
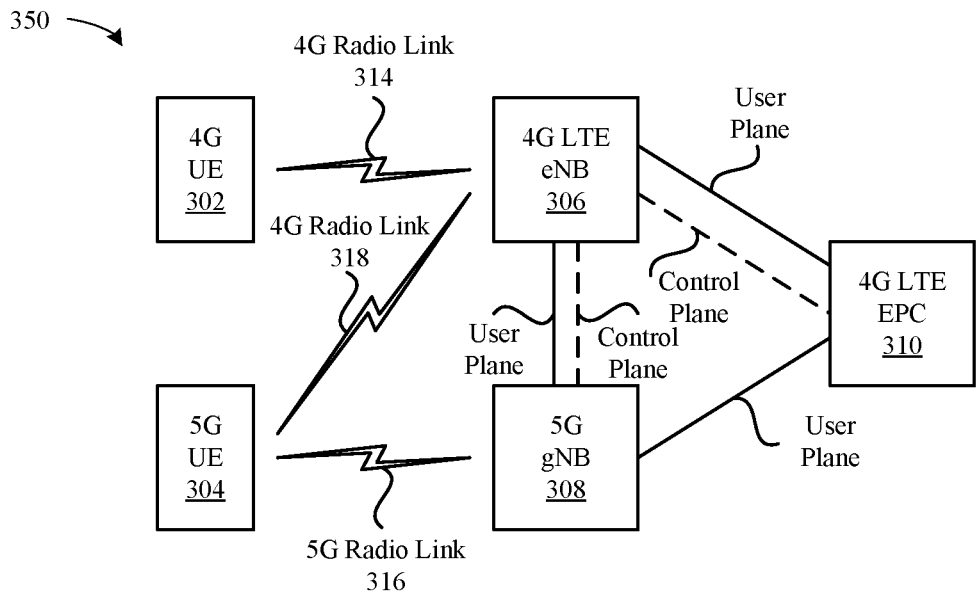

FIGS. 3A and 3B illustrate block diagrams 300/350 of 5G standalone (SA) and non-standalone (NSA) network architectures respectively. Operating in a SA mode, as shown in FIG. 3A, a 5G user equipment (UE) 304 communicates with a cellular wireless network via a 5G radio link 316 to a 5G gNB (base station) 308, while a 4G UE 302 separately communicates with its own cellular wireless network via a 4G radio link 314 to a 4G LTE eNB 306. The 5G gNB 308 is connected to a 5G next generation core (NGC) network 312 including both a user plane connection for data transfer and a control plane connection for control signaling. Similarly, the 4G LTE eNB 306 is connected to a 4G LTE enhanced packet core (EPC) 310. The 4G LTE EPC 310 network can interwork with the 5G NGC 312 network via user plane and control connections between them. 5G SA networks that include both 5G access networks based on 5G gNBs 308 and a 5G NGC 312, however, are expected to take multiple years to build out, and as such a hybrid network that includes elements of both a 4G cellular wireless network and a 5G cellular wireless network is planned for 5G UEs 304 to operate in an NSA mode as illustrated by FIG. 3B. Operating in a NSA mode, a 5G UE 304 communicates with a cellular wireless network via both a 5G radio link 316 to a 5G gNB 308 and via a separate 4G radio link 318 to a 4G LTE eNB 306. The 4G LTE eNB 306 can be used for control plane signaling and act as a primary node for access network connection with the 5G UE 304, while the 5G gNB 308 can be used for user plane data transfer and act as a secondary node for access network connection with the 5G UE 304. The 5G gNB 308 can transfer user plane data to the 4G LTE EPC 310 when directly connected to the 4G LTE EPC 310 or when indirectly connected to the 4G LTE EPC 310 via the 4G LTE eNB 306, as indicated by the user plane connection between the 4G LTE eNB 306 and the 5G gNB 308. A 4G UE 302 (or a 5G UE 304 operating in a 4G LTE mode) can connect to the 4G LTE eNB 306 via the 4G radio link 314 for both control signaling and user plane data transfer.

5G cellular wireless networks will offer higher data throughput speeds and lower latency data connections that will enhance existing services and applications while enabling new applications and services that take advantage of the improved performance 5G network. Increased performance will also entail higher power consumption and increased requirements for thermal dissipation management. To balance performance of 5G with thermal dissipation and power management requirements, mechanisms described herein provide for adapting use of applications and services for 5G connections when most suitable and/or based on user preferences. As discussed further herein, key indicators based on cellular service plan parameters (which can be included in SIM/eSIM policies and/or carrier configurations), applicability of different RATs for different applications, performance requirements (e.g., data throughput, latency, QoS) for applications, historical usage patterns for applications, services, users, and devices, as well as device component statuses (e.g., battery level, thermal management, mobility state) can be used in combination to determine recommendations for 5G cellular baseband resource usage by the 5G UE 304. In some cases, non-cellular connections can be preferred over cellular connections. In some cases, 4G LTE connections can be preferred (or used without noticeable degradation) over 5G connections. In some cases, 5G connections can be preferred over 4G LTE cellular and/or non-cellular connections.

A number of factors impact whether a given application, when used, can benefit from 5G connections including, for example, i) a known or expected amount of data to be transferred, ii) a data transfer time requirement, ii) a performance or power management setting, e.g., a low power mode, iii) a data transfer rate requirement, and/or iv) a data transfer rate cap (for the application or based on a network service policy). A given application may provide some of this information, e.g., directly via an application programming interface (API) or when requesting cellular baseband resources for an application, or indirectly via device/user/application settings or an application usage history. To determine an application's requirements, an application and communication network analysis subsystem of the mobile wireless device 102 can monitor an application's network performance, e.g., at regular intervals, and accumulate various cues for usage of the application and/or the device. Applicable cues can include intent cues that indicate an application's intent to download a certain amount of data, such as for http(s)-based applications that include a content-length entity-header field that indicates a size of an entity-body to be transferred. Values of the content-length entity-header field can be used as a proxy for an amount of data that an application intends to transfer via a data connection. Applicable cues can also include system level cues that indicate a state of the mobile wireless device 102, such as an on/off screen status that can be a proxy for whether a user of the mobile wireless device 102 is actively interacting with the mobile wireless device 102. Additional system level cues can include a state of a battery, an indication of a foreground/background status for an application, or an indication of a requirement for real-time (or near real-time) vs delay-tolerant data transfer for an application. Applicable cues can also include context cues that account for a status of the mobile wireless device 102, such as a mobility state in which the mobile wireless device 102 is in the process of transfer between different areas with variable wireless coverage. For example, when a mobile wireless device 102 moves from an area of good non-cellular wireless coverage to an area of poor non-cellular wireless coverage, where cellular wireless connections may be preferred for data transfer. Applicable cues can further include observation of network usage patterns, e.g., relatively constant transfer rates can indicate video streaming or live audio transfer, while a pattern of small burst of activity at regular intervals can indicate audio streaming. Analysis of these multiple cues can be processed to determine a recommendation for use of 5G cellular baseband resources by one or more applications of the mobile wireless device 102. In some embodiments, the recommendation includes an indication of bandwidth usage for an application, e.g., a low or high bandwidth requirement or a similar bandwidth ranking for the application. In some embodiments, the recommendation includes an indication of a confidence level for the bandwidth usage indication, e.g., a low or high confidence level or a similar confidence ranking for the bandwidth usage.

FIG. 4 illustrates an exemplary workload modeling table 400 to determine a 5G cellular baseband resource recommendation for an application based on a number of application-level and device-level factors. At the application level, an analysis subsystem can account for whether there is an audio-visual (AV) flow associated with an application operating in a foreground mode on the mobile wireless device 102. Exemplary application services that would use a foreground audio-visual flow can include a streaming media service, such as Apple TV+ or Netflix™, or a video teleconferencing service, such as Facetime® or ZOOM®. At the device level, the analysis subsystem can also account for whether a display screen of the mobile wireless device 102 is in an on state or an off state. Certain applications can operate in a background state and transfer data while a screen is in an off state and therefore may or may not benefit from access to 5G connections depending on data transfer requirements. The analysis subsystem can determine an actual or expected data transfer size or data transfer rate for an application and account for this in determining a recommendation for access to 5G connections for the application. Exemplary applications that may not require access to 5G connections can include lower data size/rate applications, such as messaging or email applications, Internet browsing, streaming audio services, e.g., Apple Music®, and voice connections. Exemplary applications that may benefit from access to 5G connections can include application download services, e.g., App Store®, connection speed test applications, backup services, e.g., iCloud Drive®, as well as Internet browsing. These factors can be used in combination to provide a 5G cellular baseband resource recommendation that indicates an actual or expected bandwidth requirement for the application and a confidence level in the bandwidth requirement. When a data transfer size is below a size threshold or a data transfer rate for an application is capped to not exceed a rate threshold, the analysis subsystem can recommend a low bandwidth connection and indicate a high confidence level in this recommendation. For a video streaming service without a data transfer rate cap, an application download from an online application service, or a data connection speed test, the analysis subsystem can recommend a high bandwidth connection with high confidence. In some embodiments, the analysis subsystem can use a truth table to map values for certain criteria to a 5G cellular baseband resource recommendation. In some embodiments, the analysis subsystem can use data driven machine learning to adapt mappings of various factors to recommendations based on a usage history for various applications. For example, a user may frequently transfer large amounts of data for a particular application, and the analysis subsystem can predict similar requirements when the particular application, or a similar application, launches and requests a connection for data transfer.

Figure 5:
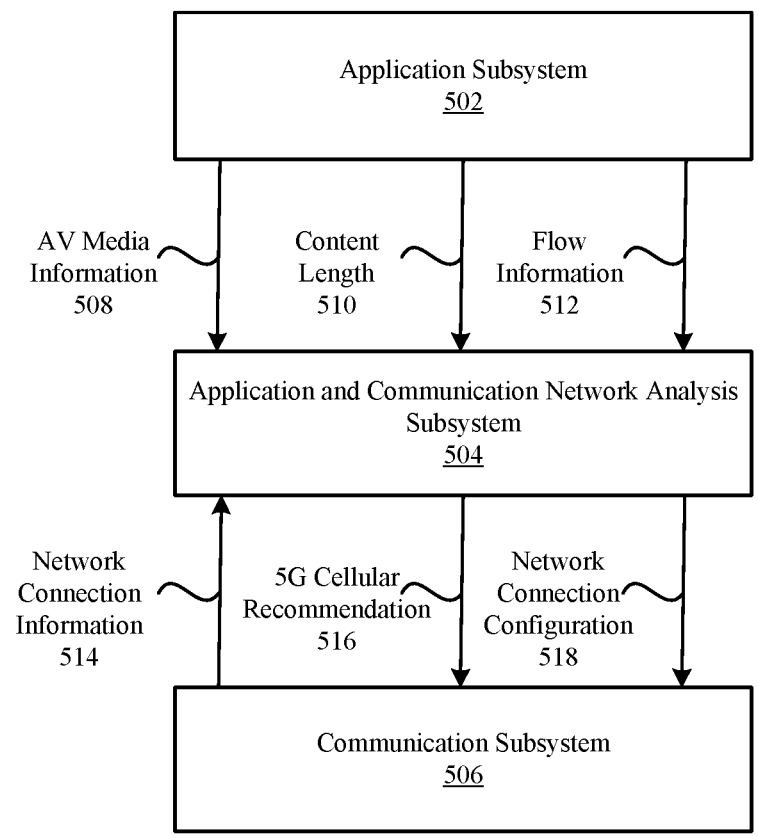
FIG. 5 illustrates a block diagram of an exemplary set of subsystems to analyze information to determine a 5G cellular baseband resource recommendation, according to some embodiments.

FIG. 5 illustrates a block diagram 500 of an exemplary set of subsystems of a mobile wireless device 102 to analyze information to determine a 5G cellular baseband resource recommendation 516. An application subsystem 502 can provide information from one or more applications that are currently in use and/or launching for use and can use communication resources. The application subsystem 502 can include components that manage and/or monitor audio/video (AV) media, such as for streaming applications, and provide AV media information 508 to an application and communication network analysis subsystem 504 to use in determining the 5G cellular baseband resource recommendation 516. The application subsystem 502 can also include components that monitor higher layer network connection flow information, such as an expected (or actual) content length 510 for network connection flows, when being established, and data flow information 512 over established network connections, e.g., whether a flow is used by an application operating in a foreground state or a background state. In some embodiments, flows are identified by universal unique identifiers (UUIDs) by the application subsystem. In some embodiments, one or more flows are characterized by traffic classes set for establishment of the one or more flows. In some embodiments, a flow without a traffic class can be monitored to detect whether a relatively constant bit rate, e.g., bounded between an effective maximum bit rate and an effective minimum bit rate, applies to the flow. In some embodiments, relatively constant, e.g., bounded, bit rates can be used for one or more AV media flows. In some embodiments, a flow can be monitored to detect occurrence of periodic transfers between idle periods. In some embodiments, a component of the application subsystem 502 provides an indication to the application and communication network analysis subsystem 504 whether a data transfer size falls below, equals, and/or exceeds a transfer size threshold. In some embodiments, a component of the application subsystem provides an indication to the application and communication network analysis subsystem 504 that a likely large, potentially unconstrained transfer size for a flow is detected. One or more of the indications regarding flow properties can be communicated by the application subsystem 502 to the application and communication network analysis subsystem 504 via the AV media information 508, content length 510, and/or flow information 512. In some embodiments, the application and communication network analysis subsystem 504 includes a flow analytics engine to process information provided by the application subsystem 502. The application and communication network analysis subsystem 504 can also receive network connection information 514 regarding properties of various cellular and non-cellular network connections from a communication subsystem 506 that controls access to cellular and non-cellular baseband resources. Network connection information 514 can include observed lower layer network properties, such as data throughput, latency, and/or interference that provide performance indications to assist with determining a 5G cellular baseband resource recommendation 516. The application and communication network analysis subsystem 504 can use the network connection information in conjunction with the information provided by the application subsystem as well as other device state, e.g., display screen state or device mobility state, and/or configuration information, e.g., user settings or preferences, to determine a 5G cellular recommendation 516 to provide to the communication subsystem 506 for configuring cellular and/or non-cellular baseband circuitry. In some embodiments, the application and communication network subsystem 504 provides network connection configuration 518 information such as whether cellular connections can be used to assist non-cellular connections or vice versa.

Figure 6:
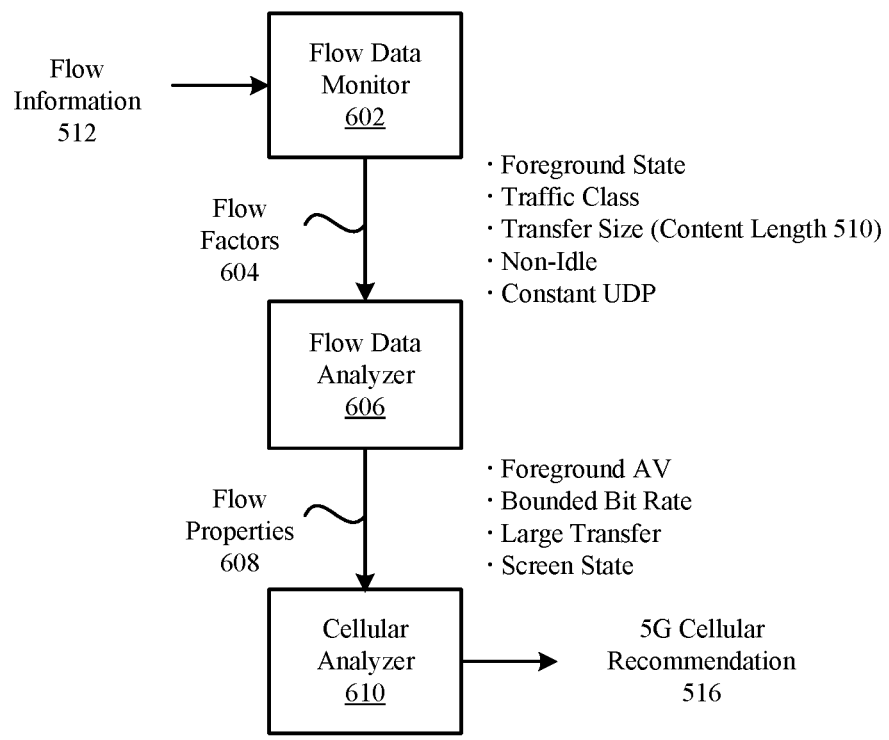
FIG. 6 illustrates a block diagram of an exemplary set of components to process information to determine a 5G cellular baseband resource recommendation, according to some embodiments.

FIG. 6 illustrates a block diagram 600 of an exemplary set of components to process information to determine a 5G cellular baseband resource recommendation 516. The components of FIG. 6 can be included in the application and communication network analysis subsystem 504 of FIG. 5, in some embodiments. A flow data monitor 602 component can receive flow information 512 for one or more flows of a mobile wireless device 102. The flow information can include (or be used to generate) one or more characteristic flow factors 604 of the one or more flows, e.g., a foreground/background state, a traffic class, a data transfer size (such as a content length 510), a non-idle/idle state, and/or a relatively constant data rate assigned to a user datagram protocol (UDP) flow, which are input to a flow data analyzer 606 component. The flow data analyzer 606 component can use the flow factors 604 and additional inputs (not shown) to determine a set of flow properties 608 to provide to a cellular analyzer 610 component to determine the 5G cellular baseband resource recommendation 516. In some embodiments, the flow properties 608 include an indication of a foreground/background state for an AV media flow, a relatively constant (and/or bounded) bit rate indication for a flow, a large transfer size/rate for a flow, and/or a display screen state of a device concurrent with one or more flows. In some embodiments, the flow properties can include indications of regular duty cycles, e.g., between idle and busy time periods. The cellular analyzer 610 can process the flow properties 608 to produce the 5G cellular baseband resource recommendation 516. In some embodiments, the 5G cellular baseband resource recommendation 516 includes a bandwidth indication and a confidence in the associated bandwidth indication for one or more flows. In some embodiments, the bandwidth indication includes one or more bits that characterize a recommended amount of communication bandwidth for use by the one or more flows. In some embodiments, values for the bandwidth indication includes a low bandwidth (at/below a first bandwidth threshold) and a high bandwidth (at/below a second bandwidth threshold). In some embodiments, the first and second bandwidth thresholds are different, while in some embodiments, the first and second bandwidth thresholds are identical. In some embodiments, the associated confidence level includes one or more bits to characterize a level of confidence in the associated bandwidth indication. In some embodiments, values for the confidence level includes a low confidence level (at/below a first confidence threshold) and a high confidence level (at/above a second confidence threshold). In some embodiments, the first and second confidence thresholds are different, while in some embodiments, the first and second confidence thresholds are identical.

FIG. 7 illustrates an exemplary smart data mode (SDM) table 700 summarizing 5G cellular baseband resource functionality based on different trigger criteria. Cellular baseband resources can belong to different radio frequency (RF) bands, and 5G cellular baseband resources can be characterized as belonging to a first radio frequency range (FR1), which includes RF bands that use radio frequencies below 6 GHZ, and or a second radio frequency range (FR2), which includes RF bands that use millimeter radio frequencies above 24 GHz. A bandwidth indication included in the 5G cellular baseband resource recommendation 516 can be used to determine whether to enable none, one, or both 5G frequency ranges FR1 and FR2. A status of a display screen of the mobile wireless device 102 can influence settings for whether 5G cellular baseband resources can be available for an application. For example, when a display screen status is in an on state, a default setting can enable access to 5G cellular baseband resources, which can be disabled on demand, such as via a user configurable setting. An indication of whether a data stall is imminent, such as for an AV media streaming application or an AV interactive session that requires continuous data flow, can be used to control access to 5G cellular baseband resources. For example, when a media stall is imminent for a flow, a controller can recommend or cause enablement of both 5G frequency ranges FR1 and FR2. A non-cellular baseband resource recommendation, e.g., a Wi-Fi status indication, can influence whether 5G cellular baseband resources are available for an application. A Wi-Fi status indication can provide information regarding Wi-Fi performance. When Wi-Fi quality is marginal and therefore cellular connections may be preferred over Wi-Fi for data connections, cellular baseband resources can be prepped for an imminent Wi-Fi disassociation. In some embodiments, when a Wi-Fi status trigger indicates that Wi-Fi is recommended over cellular baseband resources, access to 5G frequency ranges FR1 and FR2 can be disabled. A cellular data configuration setting can also influence whether 5G cellular baseband resources are available for an application. For example, when cellular data is in an off state for the mobile wireless device 102 entirely or for one or more specific applications, access to 5G frequency ranges FR1 and FR2 can be disabled for the mobile wireless device 102 or for the one or more specific applications. A status of one or more processors of the mobile wireless device 102, e.g., an application processor (AP) status, can be used to determine 5G cellular baseband resources are available for an application. For example, when an AP status indicates that the AP is in a power reduced state, access to 5G frequency ranges FR1 and FR2 can be disabled. In some embodiments, access to 5G frequency ranges FR1 and/or FR2 for an interactive audio, e.g., voice over Internet Protocol (VOIP), connection, or interactive video, e.g., Facetime, connection can be determined based on a combination of one or more device characteristics of the mobile wireless device 102, such as power consumption, battery level, thermal dissipation status, and/or mobility characteristics. In some embodiments, a mobility state of the mobile wireless device 102 can be used to determine whether a particular 5G frequency range, e.g., FR2, is available for use by the mobile wireless device 102 or one or more applications thereon. For example, when the mobility state indicates that the mobile wireless device 102 is in motion, e.g., at/above a mobility threshold associated with a change in position or rate of change in position (speed, velocity) and/or a failure threshold has been exceeded during a time period, access to FR2 can be disabled, where FR2 uses millimeter wave radio frequencies that have short range and for which transfer of a connection between base stations may be problematic. A power state or configuration of the mobile wireless device 102, e.g., when the mobile wireless device 102 is operating in (or configured to operate in) a reduced power mode, access to a particular 5G frequency range, e.g., FR2, can be disabled.

Figure 8:
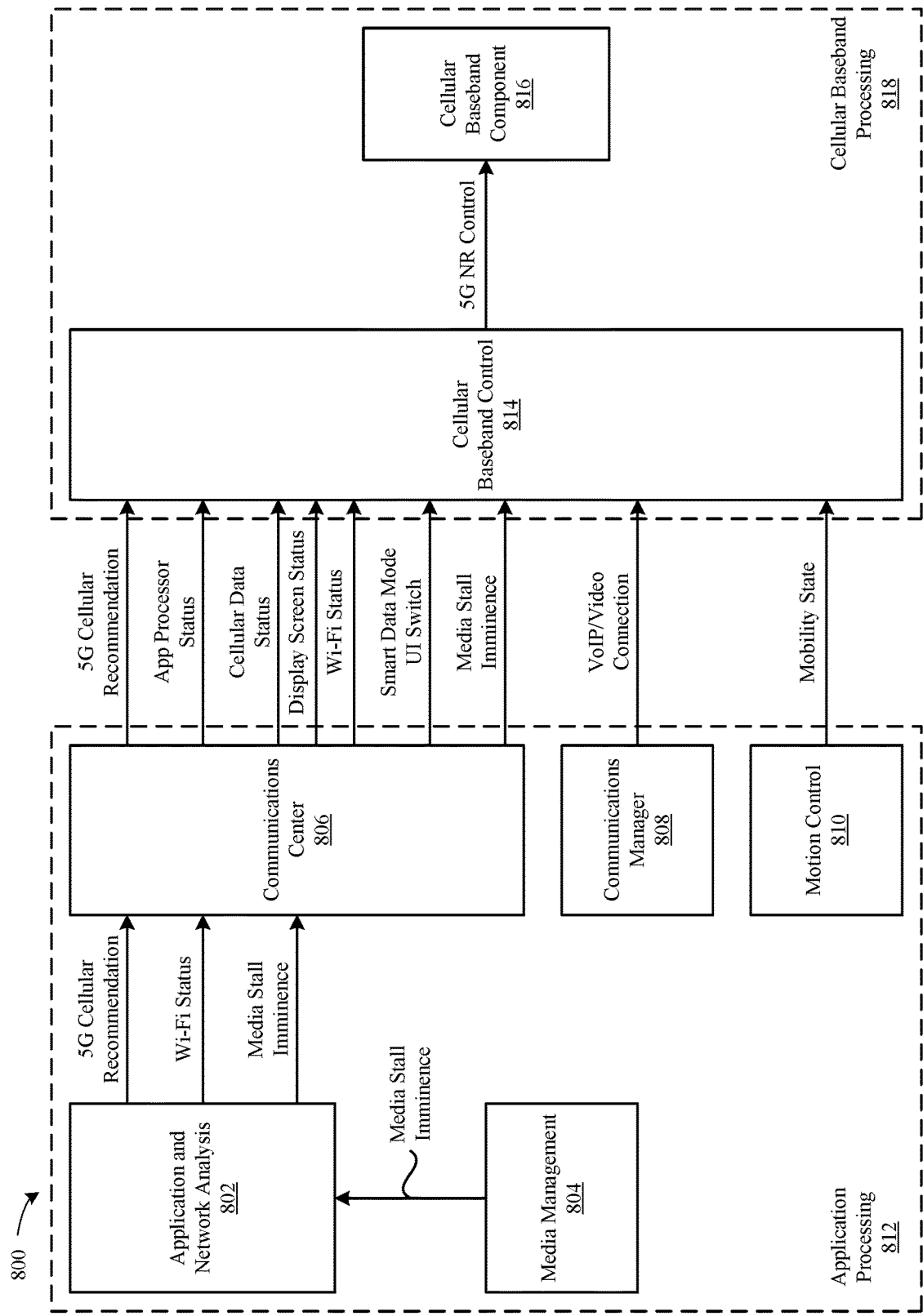
FIG. 8 illustrates a block diagram of an exemplary architecture and data flows of application processing and cellular baseband processing subsystems to control access to 5G cellular baseband resources for applications of a mobile wireless device, according to some embodiments.

FIG. 8 illustrates a block diagram 800 of an exemplary architecture and data flows of application processing 812 and cellular baseband processing 818 subsystems to control access to 5G cellular baseband resources for applications of a mobile wireless device 102. The application processing 812 subsystem can include an application and network analysis 802 block, which can correspond, in some embodiments, to the application and communication network analysis subsystem 504 of FIG. 5. The application and network analysis 802 block can obtain application flow information and communication network information and provide recommendations to a communications center 806 block. A media management 804 block can provide information regarding whether a stall is imminent for one or more AV media data streaming applications. The application and network analysis 802 block can provide a 5G cellular baseband resource recommendation 516 as well as network connection configuration 518 information, e.g., a Wi-Fi status or user configurable communication settings to the communications center 806. The communications center 806 can provide the 5G cellular baseband resource recommendation 516 to a cellular baseband control 814 block of the cellular baseband processing 818 subsystem. The communications center 806 can also provide additional information to the cellular baseband control 814 block including: i) an indication of a status of an application processor (AP), e.g., whether the AP is in a power reduced state, ii) a status of a cellular data configuration, e.g., whether data transfer via cellular radio is allowed for the mobile wireless device 102 or for one or more applications of the mobile wireless device 102, iii) a status of a display screen of the mobile wireless device 102, e.g., whether in an on or off state, iv) an indication of a preference for use of cellular connections or non-cellular connections, e.g., a Wi-Fi status, v) a status of a user configuration for use of a smart data mode (SDM), e.g., whether the user seeks to enable or disable SDM to choose use of 5G cellular baseband resources, vi) an indication of whether a stall is imminent for one or more AV media data streaming applications. In addition, a communications manager 808 block can provide information regarding one or more voice and/or video connections, e.g., status of a VoIP call and/or a Facetime call, to the cellular baseband control 814 block. Further, a motion control 810 block can monitor movement of the mobile wireless device 102 and provide an indication of a mobility state of the mobile wireless device 102, e.g., whether a speed/velocity of the mobile wireless device 102 exceeds a mobility threshold. The cellular baseband control 814 block of the cellular baseband processing 818 subsystem can aggregate and process the information received from the various blocks of the application processing 812 subsystem and determine a control signal for use of one or more 5G cellular baseband resources. In some embodiments, the cellular baseband control 814 provides a 5G new radio (NR) control signal to a cellular baseband component 816 of the cellular baseband processing 818 subsystem to indicate whether none, one, or both radio frequency ranges, e.g., FR1 and/or FR2, are accessible to one or more applications of the mobile wireless device 102.

Figure 9:
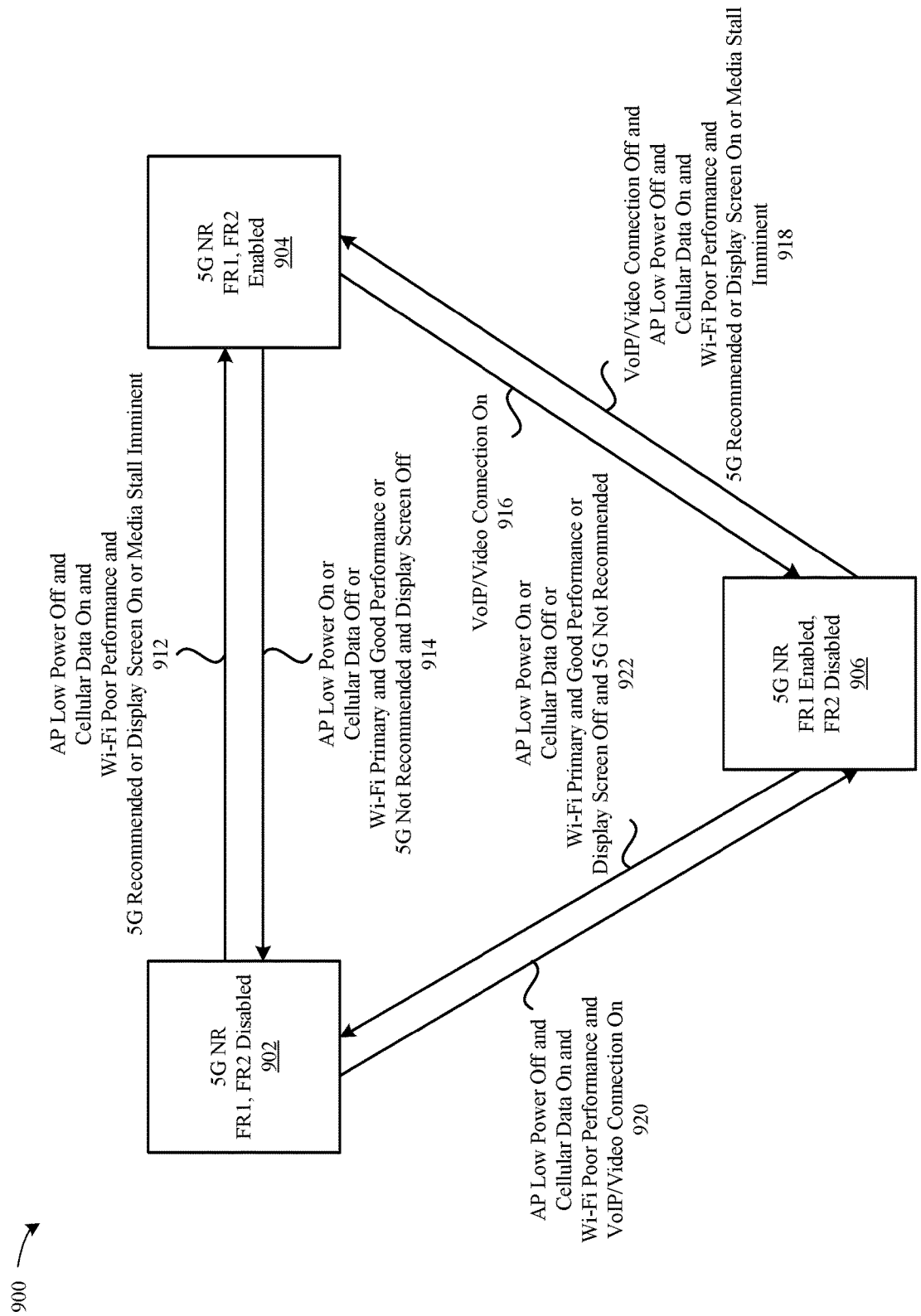
FIG. 9 illustrates a smart data mode state diagram for enabling and disabling 5G cellular radio frequency ranges based on various triggering criteria, according to some embodiments.

FIG. 9 illustrates an exemplary smart data mode (SDM) state diagram 900 for enabling and disabling 5G radio frequency ranges, e.g., FR1, FR2, based on various triggering criteria. In a 5G disabled state 902, access to the 5G new radio (NR) FR1 and FR2 bands for the mobile wireless device 102 (or for one or more applications of the mobile wireless device 102) is disabled. Certain triggering criteria can cause a state transition 912 from the 5G disabled state 902 to a dual-band 5G enabled state 904, in which both FR1 and FR2 bands are accessible to the mobile wireless device 102 (or to one or more applications of the mobile wireless device 102). The state transition 912 from FR1 and FR2 disabled to FR1 and FR2 enabled can result from a combination of triggering criteria, e.g., i) when an application processor (AP) is not in a power reduced state (AP low power off), ii) a cellular data capability for the mobile wireless device 102 (or for one or more applications on the mobile wireless device 102) is enabled (cellular data on), iii) non-cellular communication performance is below a performance threshold (Wi-Fi poor performance), and iv) one or more of the following: a 5G cellular baseband resource recommendation is positive (high bandwidth, high or low confidence level), a display screen status indicates the display screen is on, or a data stall for a AV media streaming or interactive session application is imminent. Additional triggering criteria can cause a state transition 914 from the dual-band 5G enabled state 904 to the 5G disabled state 902. The state transition 914 from FR1 and FR2 enabled to FR1 and FR2 disabled can result from any one or more of a set of triggering criteria, e.g., i) when an AP is in a power reduced state (low power on), ii) a cellular data capability for the mobile wireless device 102 (or for one or more applications on the mobile wireless device 102) is disabled (cellular data off), iii) non-cellular communication performance exceeds a performance threshold and is preferred over cellular communication for data connections (Wi-Fi primary and good performance), or iv) a 5G cellular baseband resource recommendation is negative (low bandwidth, high confidence level) and a display screen status indicates the display screen is off.

Triggering criteria can also cause a state transition 916 from the dual-band 5G enabled state 904 to a single-band 5G enabled state 906, in which a lower frequency range FR1 is enabled and a higher frequency range FR2 is disabled. The state transition 916 can occur when a packet voice connection, e.g., a VoIP call or Facetime Audio call, or an interactive video connection, e.g., a Facetime call, occurs (VOIP/video connection on). Triggering criteria can also cause a state transition 918 from the single-band 5G enabled state 906, in which FR1 is enabled and FR2 is disabled, to the dual-band 5G enabled state 904 based on a combination of conditions being satisfied. The state transition 918 can occur when the following combination of triggering criteria occur: i) no packet voice connection or interactive video connection is occurring (VOIP/video connection off), ii) when an application processor (AP) is not in a power reduced state (AP low power off), iii) a cellular data capability for the mobile wireless device 102 (or for one or more applications on the mobile wireless device 102) is enabled (cellular data on), iv) non-cellular communication performance is below a performance threshold (Wi-Fi poor performance), and v) one or more of the following: a 5G cellular baseband resource recommendation is positive (high bandwidth, high or low confidence level), a display screen status indicates the display screen is on, or a data stall for a AV media streaming or interactive session application is imminent.

Triggering criteria can also cause a state transition 922 from the single-band 5G enabled state 906 to the 5G disabled state 902. The state transition 922 can occur when any one or more of a set of triggering criteria, e.g., i) when an AP is in a power reduced state (low power on), ii) a cellular data capability for the mobile wireless device 102 (or for one or more applications on the mobile wireless device 102) is disabled (cellular data off), iii) non-cellular communication performance exceeds a performance threshold and is preferred over cellular communication for data connections (Wi-Fi primary and good performance), or iv) a 5G cellular baseband resource recommendation is negative (low bandwidth, high confidence level) and a display screen status indicates the display screen is off. Another combination of triggering criteria can cause a state transition 920 from the 5G disabled state 902 to the single-band 5G enabled state 906. The state transition 920 can occur when a combination of trigger criteria occurs, e.g., i) when an application processor (AP) is not in a power reduced state (AP low power off), ii) a cellular data capability for the mobile wireless device 102 (or for one or more applications on the mobile wireless device 102) is enabled (cellular data on), iii) non-cellular communication performance is below a performance threshold (Wi-Fi poor performance), and iv) a packet voice connection, e.g., a VoIP call or Facetime Audio call, or an interactive video connection, e.g., a Facetime call, occurs (VOIP/video connection on).

FIG. 10 illustrates a summary table 1000 that maps a 5G cellular baseband resource recommendation to a 5G cellular baseband control action. In some embodiments, when the 5G cellular baseband resource recommendation indicates a requirement by an application for (or an expectation of a usage by an application of) high bandwidth data transfer, access to use of one or both 5G radio frequency ranges FR1 and FR2 is enabled. In some embodiments, when a confidence level is high that a high bandwidth data transfer is not required or expected, access to use of both 5G radio frequency ranges FR1 and FR2 is disabled. In some embodiments, when a confidence level is low in a 5G cellular baseband resource recommendation regarding whether a high bandwidth data transfer is required, access to 5G radio frequency ranges FR1 and FR2 is enabled.

Figure 11:
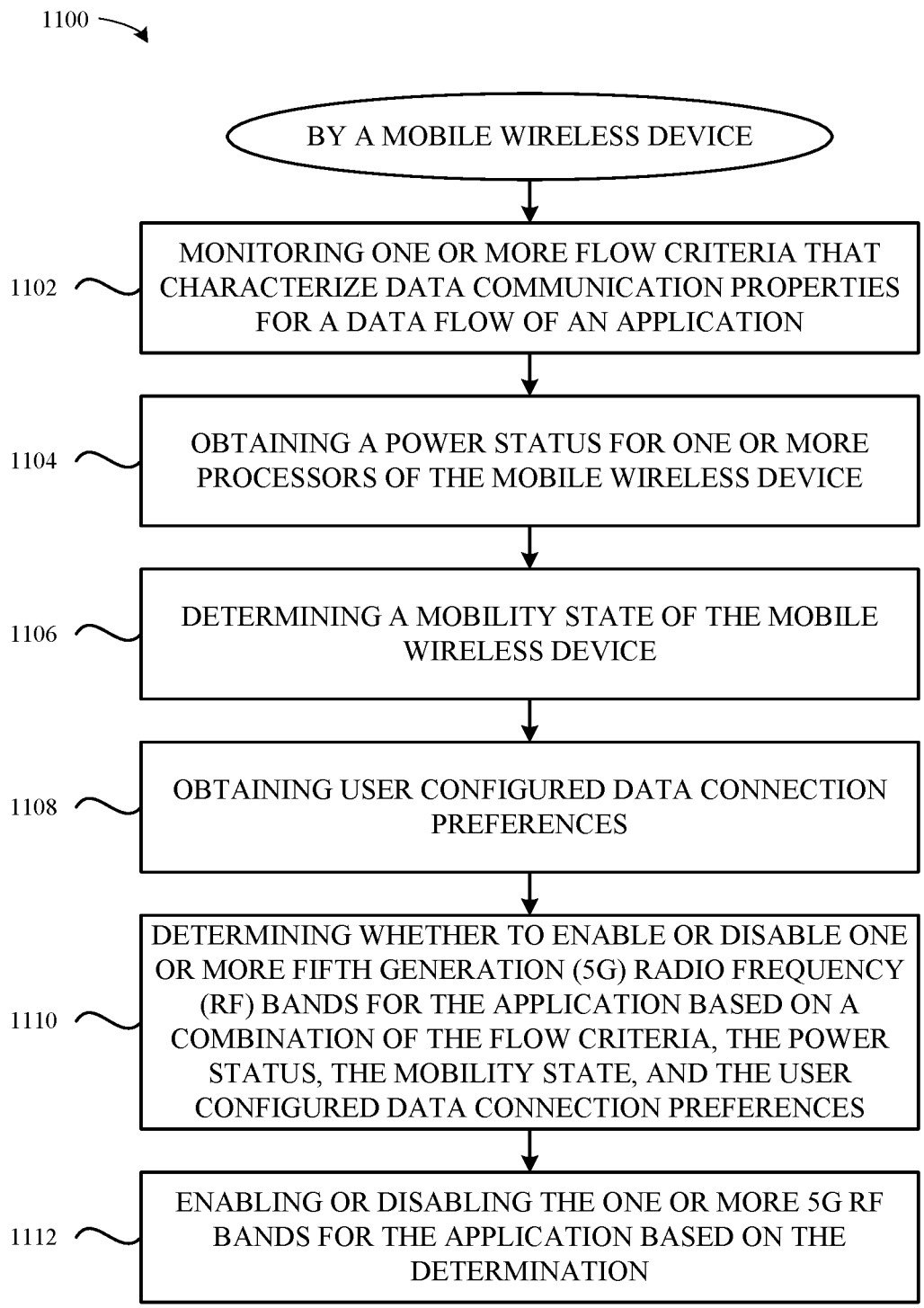
FIG. 11 illustrates an exemplary method for controlling access to 5G cellular baseband resources, according to some embodiments.

FIG. 11 illustrates a flowchart 1100 of an exemplary method to control access to 5G cellular baseband resources by a mobile wireless device 102. At 1102, the mobile wireless device 102 monitors one or more flow criteria that characterize data communication properties for a data flow of an application resident on the mobile wireless device 102. At 1104, the mobile wireless device obtains a power status for one or more processors of the mobile wireless device 102. At 1106, the mobile wireless device 102 determines a mobility state of the mobile wireless device 102. At 1108, the mobile wireless device obtains user configured data connection preferences. At 1110, the mobile wireless device 102 determines whether to enable or disable one or more 5G radio frequency (RF) bands for the application based on a combination of i) the flow criteria, ii) the power status, iii) the mobility state, and iv) the user configured data connection preferences. At 1112, the mobile wireless device 102 enables or disables the one or more 5G RF bands for the application based on the determination.

In some embodiments, the one or more flow criteria include an indication of a foreground or background state for the application, a traffic class for the data flow of the application, and a data transfer size or content length for the application. In some embodiments, the one or more flow criteria include an indication of an imminent data stall for an audio/video (AV) media streaming application. In some embodiments, the mobile wireless device 102 enables the one or more 5G RF bands for the AV media streaming application. In some embodiments, the power status for the one or more processors indicates an application processor is in a power reduced state; and the mobile wireless device 102 disables the one or more 5G RF bands for the application. In some embodiments, the mobility state indicates the mobile wireless device 102 exceeds a mobility threshold and a number of data connection failures in a time period exceeds a failure threshold; and the mobile wireless device 102 disables the one or more 5G RF bands for the application. In some embodiments, the user configured data connection preferences include an indication that cellular data usage is disabled for the application; and the mobile wireless device 102 disables the one or more 5G RF bands for the application. In some embodiments, the one or more 5G RF bands includes a first 5G RF band that uses radio frequencies below 6 GHz and a second 5G RF band that uses millimeter radio frequencies above 24 GHz.

Figure 12:
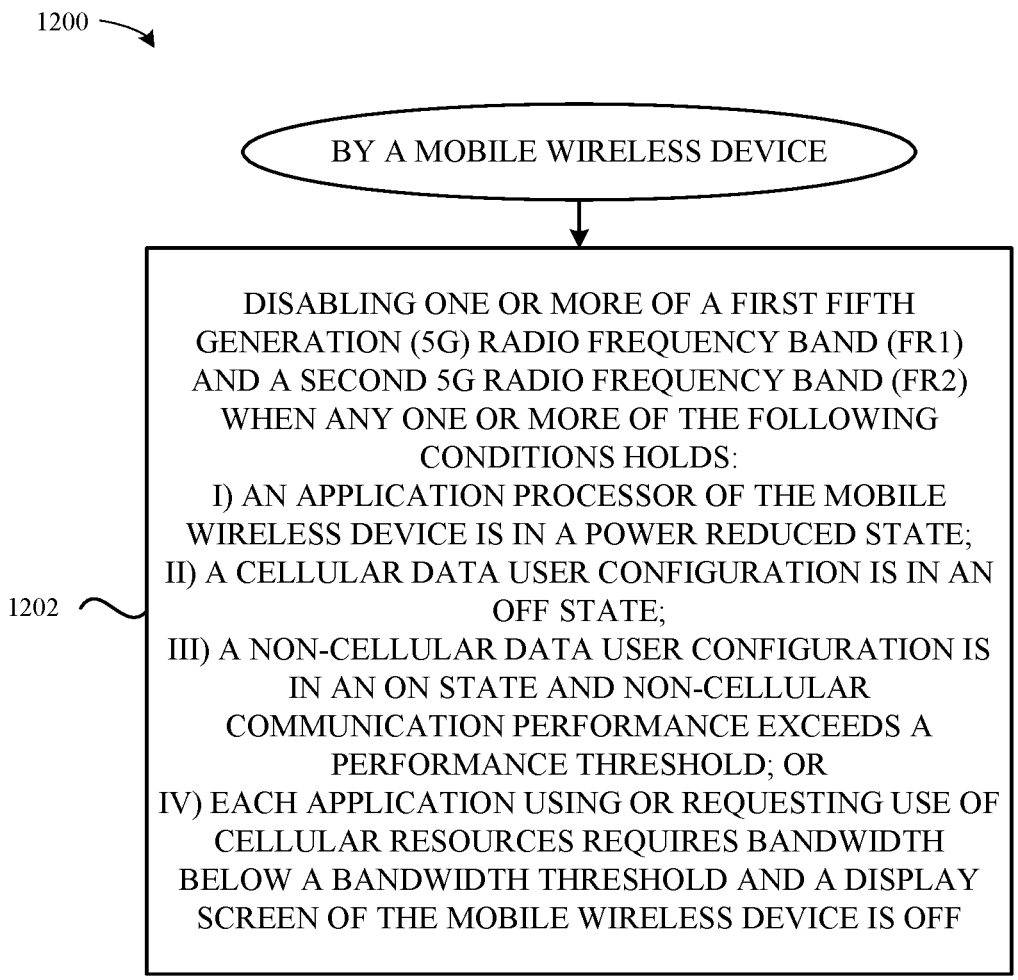
FIG. 12 illustrates another exemplary method for controlling access to 5G cellular baseband resources, according to some embodiments.

FIG. 12 illustrates a flowchart 1200 of an exemplary method to control access to 5G cellular baseband resources by a mobile wireless device 102. At 1202, the mobile wireless device 102 disables one or more of a first fifth generation (5G) radio frequency band (FR1) and a second 5G radio frequency band (FR2) when any one or more of the following conditions hold: i) an application processor of the mobile wireless device is in a power reduced state; ii) a cellular data user configuration is in an off state; iii) a non-cellular data user configuration is in an on state and non-cellular communication performance exceeds a performance threshold; or iv) each application using or requesting use of cellular resources requires bandwidth below a bandwidth threshold and a display screen of the mobile wireless device is off.

In some embodiments, the mobile wireless device 102 disables FR2 when a packet voice or interactive video connection is active. In some embodiments, the mobile wireless device enables FR1 when: i) the application processor of the mobile wireless device is not in a power reduced state; ii) ii) the cellular data user configuration is in an on state; iii) iii) the non-cellular communication performance falls below the performance threshold; and iv) iv) a packet voice or interactive video connection is active. In some embodiments, the mobile wireless device 102 enables FR1 and FR2 when: i) the application processor of the mobile wireless device is not in a power reduced state; ii) the cellular data user configuration is in an on state; iii) the non-cellular communication performance falls below the performance threshold; and iv) a data stall for an audio/video (AV) media streaming application is imminent. In some embodiments, FR1 includes one or more RF bands that use radio frequencies below 6 GHz; and FR2 includes one or more RF bands that use millimeter radio frequencies above 24 GHz.

Representative Exemplary Apparatus

Figure 13:
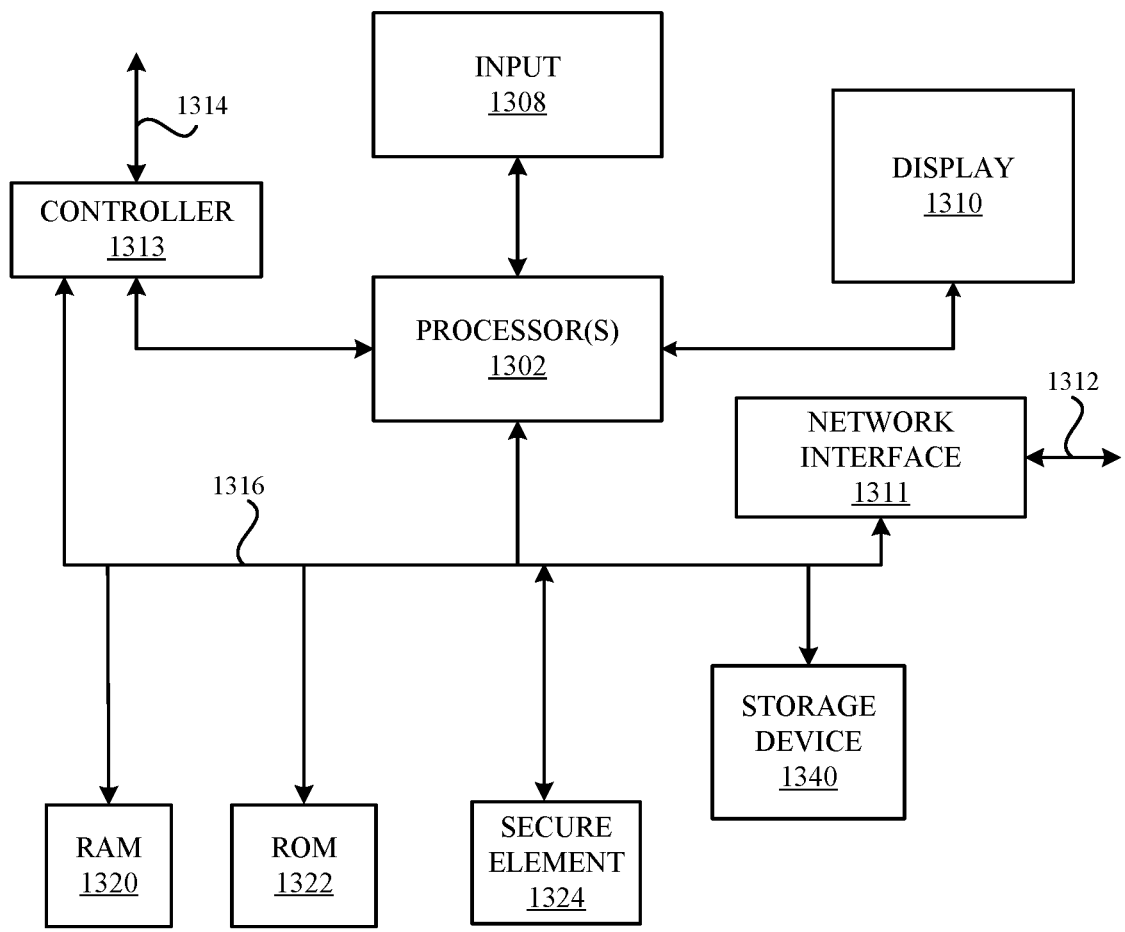
FIG. 13 illustrates a block diagram of exemplary elements of a mobile wireless device, according to some embodiments.

FIG. 13 illustrates in block diagram format an exemplary computing device 1300 that can be used to implement the various components and techniques described herein, according to some embodiments. In particular, the detailed view of the exemplary computing device 1300 illustrates various components that can be included in the mobile wireless device 102. As shown in FIG. 13, the computing device 1300 can include one or more processors 1302 that represent microprocessors or controllers for controlling the overall operation of computing device 1300. In some embodiments, the computing device 1300 can also include a user input device 1308 that allows a user of the computing device 1300 to interact with the computing device 1300. For example, in some embodiments, the user input device 1308 can take a variety of forms, such as a button, keypad, dial, touch screen, audio input interface, visual/image capture input interface, input in the form of sensor data, etc. In some embodiments, the computing device 1300 can include a display 1310 (screen display) that can be controlled by the processor(s) 1302 to display information to the user (for example, information relating to incoming, outgoing, or active communication sessions). A data bus 1316 can facilitate data transfer between at least a storage device 1340, the processor(s) 1302, and a controller 1313. The controller 1313 can be used to interface with and control different equipment through an equipment control bus 1314. The computing device 1300 can also include a network/bus interface 1311 that couples to a data link 1312. In the case of a wireless connection, the network/bus interface 1311 can include wireless circuitry, such as a wireless transceiver and/or baseband processor. The computing device 1300 can also include a secure element 1324. The secure element 1324 can include an eUICC 108.

The computing device 1300 also includes a storage device 1340, which can include a single storage or a plurality of storages (e.g., hard drives), and includes a storage management module that manages one or more partitions within the storage device 1340. In some embodiments, storage device 1340 can include flash memory, semiconductor (solid state) memory or the like. The computing device 1300 can also include a Random-Access Memory (RAM) 1320 and a Read-Only Memory (ROM) 1322. The ROM 1322 can store programs, utilities or processes to be executed in a non-volatile manner. The RAM 1320 can provide volatile data storage, and stores instructions related to the operation of the computing device 1300.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for controlling access to fifth generation (5G) cellular baseband resources, the method comprising:
by a mobile wireless device:
monitoring one or more flow criteria that characterize data communication properties for a data flow of an application;
obtaining a power status for one or more processors of the mobile wireless device;
determining a mobility state of the mobile wireless device;
obtaining user configured data connection preferences;
determining whether to enable or disable one or more 5G radio frequency (RF) bands for the application based on a combination of the flow criteria, the power status, the mobility state, and the user configured data connection preferences; and
enabling or disabling the one or more 5G RF bands for the application based on the determination.

2. The method of claim 1, wherein:
the one or more flow criteria include an indication of a foreground or background state for the application, a traffic class for the data flow of the application, and a data transfer size or content length for the application.

3. The method of claim 1, wherein
the one or more flow criteria include an indication of an imminent data stall for an audio/video (AV) media streaming application.

4. The method of claim 3, wherein the mobile wireless device enables the one or more 5G RF bands for the AV media streaming application.

5. The method of claim 1, wherein:
the power status for the one or more processors indicates an application processor is in a power reduced state, and the mobile wireless device disables the one or more 5G RF bands for the application.

6. The method of claim 1, wherein:
the mobility state indicates the mobile wireless device exceeds a mobility threshold and a number of data connection failures in a time period exceeds a failure threshold, and
the mobile wireless device disables the one or more 5G RF bands for the application.

7. The method of claim 1, wherein:
the user configured data connection preferences include an indication that cellular data usage is disabled for the application, and
the mobile wireless device disables the one or more 5G RF bands for the application.

8. The method of claim 1, wherein the one or more 5G RF bands comprises a first 5G RF band that uses radio frequencies below 6 GHz and a second 5G RF band that uses millimeter radio frequencies above 24 GHz.

9. A method for controlling access to a first fifth generation (5G) radio frequency band (FR1) and a second 5G radio frequency band (FR2) by a mobile wireless device, the method comprising:
by the mobile wireless device:
disabling one or more of FR1 and FR2 when any one or more of:
  i) an application processor of the mobile wireless device is in a power reduced state;
  ii) a cellular data user configuration is in an off state;
  iii) a non-cellular data user configuration is in an on state and non-cellular communication performance exceeds a performance threshold; or
  iv) each application using or requesting use of cellular resources requires bandwidth below a bandwidth threshold and a display screen of the mobile wireless device is off.

10. The method of claim 9 further comprising:
by the mobile wireless device:
disabling FR2 when a packet voice or interactive video connection is active.

11. The method of claim 9 further comprising:
by the mobile wireless device:
enabling FR1 when:
  i) the application processor of the mobile wireless device is not in a power reduced state;
  ii) the cellular data user configuration is in an on state;
  iii) the non-cellular communication performance falls below the performance threshold; and
  iv) a packet voice or interactive video connection is active.

12. The method of claim 9 further comprising:
by the mobile wireless device:
enabling FR1 and FR2 when:
  i) the application processor of the mobile wireless device is not in a power reduced state;
  ii) the cellular data user configuration is in an on state;
  iii) the non-cellular communication performance falls below the performance threshold; and
  iv) a data stall for an audio/video (AV) media streaming application is imminent.

13. The method of claim 9, wherein:
FR1 comprises one or more RF bands that use radio frequencies below 6 GHz; and
FR2 comprises one or more RF bands that use millimeter radio frequencies above 24 GHz.

14. An apparatus configurable for operation in a mobile wireless device, the apparatus comprising one or more processors coupled to a memory storing instructions that, when executed by the one or more processors, cause the mobile wireless device to perform actions that include:
monitoring one or more flow criteria that characterize data communication properties for a data flow of an application;
obtaining a power status for one or more processors of the mobile wireless device;
determining a mobility state of the mobile wireless device;
obtaining user configured data connection preferences;
determining whether to enable or disable one or more fifth generation (5G) radio frequency (RF) bands for the application based on a combination of the flow criteria, the power status, the mobility state, and the user configured data connection preferences; and
enabling or disabling the one or more 5G RF bands for the application based on the determination.

15. The apparatus of claim 14, wherein:
the one or more flow criteria include an indication of a foreground or background state for the application, a traffic class for the data flow of the application, and a data transfer size or content length for the application.

16. The apparatus of claim 14, wherein
the one or more flow criteria include an indication of an imminent data stall for an audio/video (AV) media streaming application.

17. The apparatus of claim 16, wherein the mobile wireless device enables the one or more 5G RF bands for the AV media streaming application.

18. The apparatus of claim 14, wherein:
the power status for the one or more processors indicates an application processor is in a power reduced state, and
the mobile wireless device disables the one or more 5G RF bands for the application.

19. The apparatus of claim 14, wherein:
the mobility state indicates the mobile wireless device exceeds a mobility threshold and a number of data connection failures in a time period exceeds a failure threshold, and
the mobile wireless device disables the one or more 5G RF bands for the application.

20. The apparatus of claim 14, wherein:
the user configured data connection preferences include an indication that cellular data usage is disabled for the application, and
the mobile wireless device disables the one or more 5G RF bands for the application.

* * * * *